(12) United States Patent
Nylen

(10) Patent No.: US 6,450,120 B1
(45) Date of Patent: Sep. 17, 2002

(54) BIRD FEEDER HAVING APERTURED PLASTIC FLOOR

(76) Inventor: David E. Nylen, 617 N. 10th, Winterset, IA (US) 50273

( * ) Notice: Subject to any disclaimer, the term of this patent is extended or adjusted under 35 U.S.C. 154(b) by 0 days.

(21) Appl. No.: 09/754,437

(22) Filed: Jan. 4, 2001

(51) Int. Cl.$^7$ ............................................... A01K 61/02
(52) U.S. Cl. ..................................................... 119/52.2
(58) Field of Search ............................ 119/52.2, 52.3, 119/52.4, 459, 461, 462, 463

(56) References Cited

U.S. PATENT DOCUMENTS 6,095,087 A * 8/2000 Bloedorn ................... 119/52.2

* cited by examiner

Primary Examiner—Thomas Price
(74) Attorney, Agent, or Firm—McKee, Voorhees & Sease, P.L.C.

(57) ABSTRACT

A bird feeder and other associated products having an apertured plastic floor which may be slideably and selectively removable for easy cleaning and replacement. A feed bin is defined by a set of walls, a floor and a roof. When a hinged portion of the roof is opened, at least one section of the walls is slideably removable, and the apertured plastic floor is also slideably removable. The apertured floor, which is manufactured of a perforated plastic, provides a sheet material with a pattern of holes which is strong enough to support the weight of the seed, permits drainage to keep the seed dry, and is capable of withstanding both the avian usage as well as cleaning and maintenance.

7 Claims, 6 Drawing Sheets

BIRD FEEDER HAVING APERTURED PLASTIC FLOOR

BACKGROUND OF THE INVENTION

1. Field of the Invention

The present invention relates to a bird feeder and associated products, in particular, having an apertured floor member which is manufactured from a plastic material and is selectively removable for easy cleaning.

2. Background of the Related Art

Many types and designs of bird feeders and related products have been developed and are used widely throughout the country. For example, U.S. Pat. No. 6,095,087 issued to Dan Bloedorn and patents cited therein, is incorporated herein by this reference.

One problem common to many types of bird feeders is the difficulty cleaning the feeder, especially the bottom of the feeder. If seed sits in a feeder or related product for a lengthy period of time, the seed itself can become lodged within the crevices and spaces of the feeder, it can rot, and can detract from the purpose of the bird feeder, that is, to attract birds and allow the viewing pleasure of a user. In addition, it is possible that seed that is not cleaned from the feeder can become rotten and contribute to the spread of disease. This problem can be made worse should a user replace only the top layer of seed and not allow the seed to be consumed all the way to the bottom of a feeder thereby causing increased spoilage and cleaning problems.

Previous feeders have incorporated various types of metal materials to the bottom or floor of the feeder, including mesh screens, expanded metal, perforated metal, and the like which were subject to oxidization and corrosion, and could taint the seed in the feeder with its rust. However, in the past, plastics and similar materials were thought unsuitable because it was incorrectly believed that such materials required expensive molding equipment, and were therefore too expensive. Perforated non-molded plastic was not considered.

It is therefore desirable to design a bird feeder which will keep bird seed dry and unspoiled as long as possible, which is easy to clean.

SUMMARY OF THE INVENTION

A bird feeder includes a bird seed containment area having an apertured floor member manufactured from a perforated plastic material. In some modifications of the invention, the floor member is selectively removable from the bin for easy cleaning. In others, it is not removable. The bird feeder itself generally comprises a set of walls, roof and floor for defining a bird seed containment area. The bird seed containment area includes a compartment having an opening for receiving bird seed and an opening for dispensing bird seed. In particular, a hinged portion of the roof may be opened for depositing bird seed into the bin, and closed to cover and protect the seed or other eatable material from the elements. The bird feeder may also be designed so that, when the hinged portion of the roof is open, certain portions or sections of one or more walls may be slideably removed, which facilitate the assembly of the bird feeder as well as facilitating the cleaning of the various portions thereof.

As mentioned, the bird feeder is provided with a selectively removable apertured floor manufactured from a perforated plastic material. The apertured floor member is supported on an edge support surface on the inner periphery of the lower portion of the bird seed containment area. The apertured floor preferably comprises a perforated plastic sheet in a generally rectangular flat shape, having no upturned edges like typical tray-like floor members found in the prior art. The apertured floor is made from a particular material which is strong enough to support the weight of the seed and feed within the seed containment area without the need for additional support structures.

The primary object of the invention is to produce a bird feeder that is easier to keep clean than conventional feeders and to do so at a reasonable cost while avoiding the disadvantage of using various types of metal. The material can also be made of a certain color without the need to paint or coat it, as would be necessary if constructed of metal. The apertures in the floor member are naturally small enough to contain the bird seed and other eatable material within the seed containment area, but allow moisture and air to circulate within the feeder in order to keep the seed dry and thereby reducing the occurrence of the seed becoming moldy or to sprout. Consideration should also be given to the size of bird to which the feeder is directed as it is possible that talons, beaks, or other appendages could get stuck in the apertures. The apertured floor sits within the bottom of the hopper and can be selectively removed from and replaced within the bottom of the feeder. The floor has a relatively smooth surface for easy cleaning. A sturdy, cost effective, easy-to-clean bird feeder will reduce the incidence of diseases being transmitted through rotten bird seed and lead to a healthier local bird population while not corroding or oxidizing. In certain situations, it may be desirable to use clear plastic to allow a view of the interior of the feeder from the feeder's underside.

Other advantages of the invention will become apparent from the following description taken in connection with the accompanying drawings which set forth, by way of illustration and example only, certain embodiments of the present invention.

BRIEF DESCRIPTION OF THE DRAWINGS

The drawings, which constitute part of the specification and include exemplary embodiments of the present invention, include the following.

DETAILED DESCRIPTION OF THE PREFERRED EMBODIMENT

Figure 2:
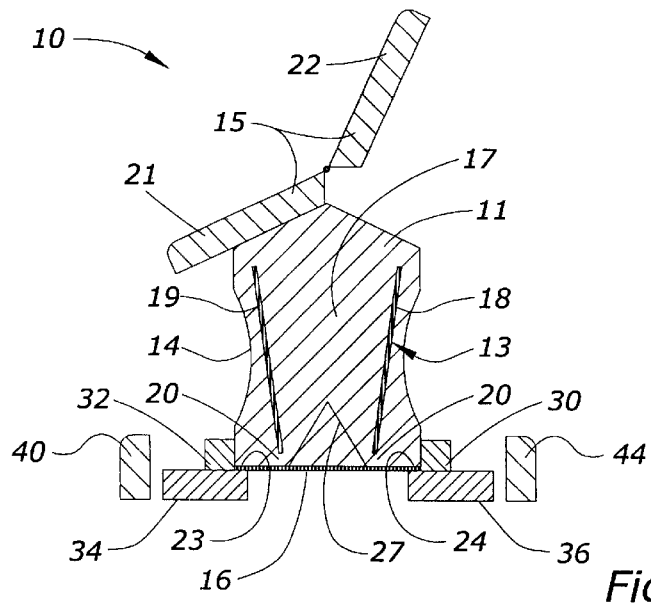
FIG. 2 is a sectional view of the feeder taken along line 2—2 in FIG. 1.
Figure 1:
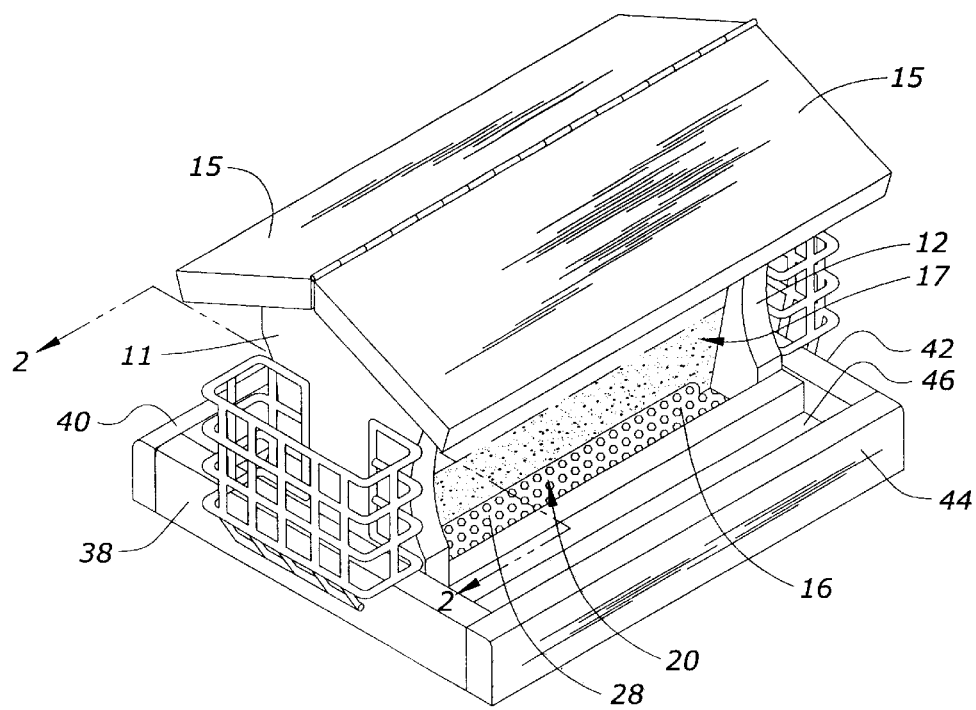
FIG. 1 is a perspective view of an embodiment of a feeder using perforated plastic.

With reference to FIGS. 1 and 2, typical feeder 10 comprises a first wall 11, a second wall 12, a third wall 13, a fourth wall 14, a roof 15 and a floor 16 for defining a bird feed containment area 17. The first wall 11 is spaced apart from the second wall 12, and the third wall 13 is spaced apart from the fourth wall 14, in order to form a box-like hopper. The first and second walls 11, 12 are preferably made of wood, for example inland cedar, or other suitable material.

The third and fourth walls 13, 14 are mounted in a tongue and groove-like fashion to the first and second walls 11, 12. Specifically, the first wall 11 has a first groove 18 near one of its side edges, has a second groove 19 near its opposite side edge. Second wall 12 is also provided with similar grooves 18, 19, which register with the grooves 18, 19, of the first wall 11. The third wall 13 is slideably disposed within the first groove 18 of the first and second walls 11, 12, respectively. Similarly, the fourth wall 14 is slideably disposed within the second groove 19 of the first wall 11 and the second wall 12. The third and fourth walls, 13, 14, are preferably made of glass, plastic, Plexiglas, or other transparent material so the birds can see the feed inside the feeder and a user can assess the amount of seed that remains. The bird feed and seed is dispensed out through an undercut portion 20 of the third and fourth walls 13, 14 adjacent to the floor 16 which provides a passage from the interior of the seed containment area 17 to an exterior feeding area.

The roof 15 comprises a first portion 21 which is secured by nails, screws, adhesive, or other suitable fastening means, to the upper surface of the first and second walls, 11, 12. The roof 15 further has a second portion 22 which is hinged to the fixed first portion 21. The hinged portion 22 of the roof is capable of being raised to an open position for depositing bird seed and other feed material into the hopper 17, and a closed position for covering the hopper 17. When the hinged portion 22 of the roof is open, at least one clear pane (for example, the third wall 13) is selectively and slideably removable from the grooves in the first and second walls, 11, 12.

The floor 16 comprises an apertured floor member (discussed in more detail below) which rests on the bottom of the bin 17. Attached to the opposite lower edges of walls 11, 12 are two confining ribs 30, 32, and attached to the bottoms of support ribs 30, 32 are two support members 34, 36. The floor 16 rests on edge support surfaces 30, 32 on the inner periphery of the lower portion of the bin 17. Preferably, the floor edge support members 34, 36 include first and second support surfaces 23, 24, adjacent the lower edges of first and second walls 11, 12, respectively. Ordinarily, only two edge support surfaces 23, 24 for supporting the floor 16 are needed, although others may be added if desired. The apertured floor 16 rests upon edge support surfaces 23, 24 and is contained within the first wall 11, second wall 12, the two support ribs 30, 32. Confining walls 38, 40, 42, 44 are attached around the bottom of the feeder 10 to create a tray 46.

As mentioned, the floor 16 is generally comprised of a clear apertured plastic member and is substantially planar in configuration with no upturned edges. This makes this floor 16 unlike the tray-like flooring member used in the Bloedorn, U.S. Pat. No. 6,095,087 and is much cheaper to manufacture and use in various designs without additional machining or forming. The floor 16 itself has a pattern of holes 28 which permit moisture to be drained through the floor of the bird feeder, and yet has sufficient strength to support the weight of the bird feed and seed contained in the hopper without the need of additional structural members. The floor is preferably made of a perforated plastic material having generally round holes. However, the holes may have almost any shape for purposes of the present invention.

Other decorative designs and patterns are possible. Suitable perforated plastic sheets are available from Erdle Perforating Company, located at 100 Pixley Industrial Parkway, Rochester, N.Y. 14603-1568. Perforation size, shape, spacing, and arrangement are variable. Presently the perforations used are circular, having a diameter of 3/32 inches, are staggered offset 5/32 inches from center. The sheet has an open area of 33%. Further, the floor itself may be colored, such as green or black, or can be clear or opaque allowing a user from underneath the feeder to view the bottom most layer of seed in order to access both the level of seed required as well as the cleanliness and degree of decay of the seed contained in the seed containment area.

For larger feeders it is sometimes necessary for an independently removable central raised portion 27 to be inserted into the seed containment area 17 in order to force the bird seed outwardly towards the undercut feed dispensing portions 20 in the third and fourth walls so that the birds may reach it and feed upon it. Raised portion 27 may be attached to the floor member 16 to add to the structural rigidity of the floor member, but is preferably removable to aid for cleaning when the hinged portion of the roof is open. A ridge or pyramid shape may be used as this raised portion 27 to force the seed into the dispensing area 20. Other shapes and configurations may be used for the raised portion 27. If independently removable, it may be cleaned and constructed separately from the floor member 16.

Figure 4:
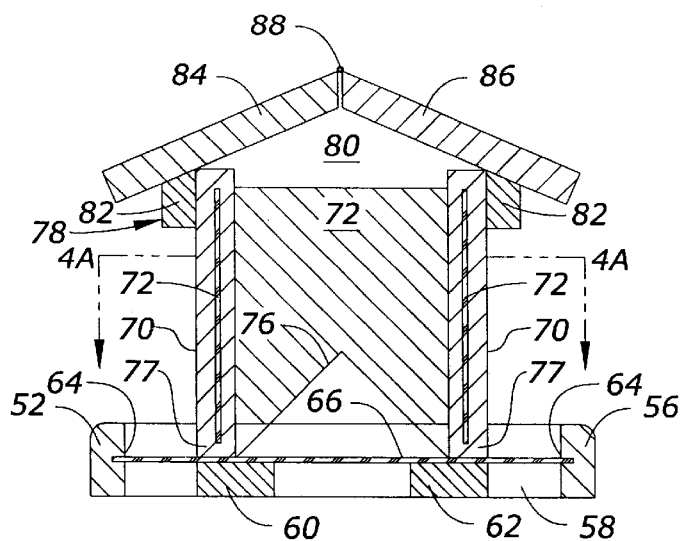
FIG. 4 is a sectional view of the feeder taken along line 4—4 of FIG. 3.
Figure 3:
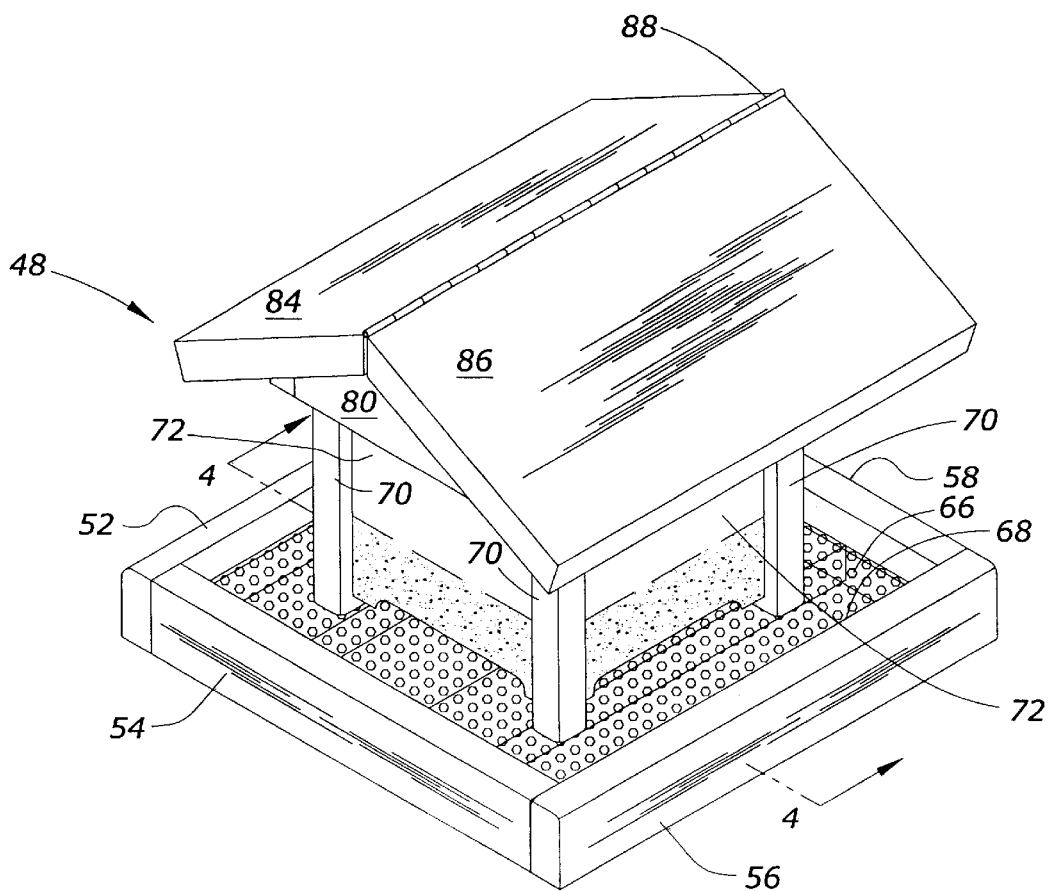
FIG. 3 is a perspective view of another embodiment of a feeder using perforated plastic.
Figure 4A:
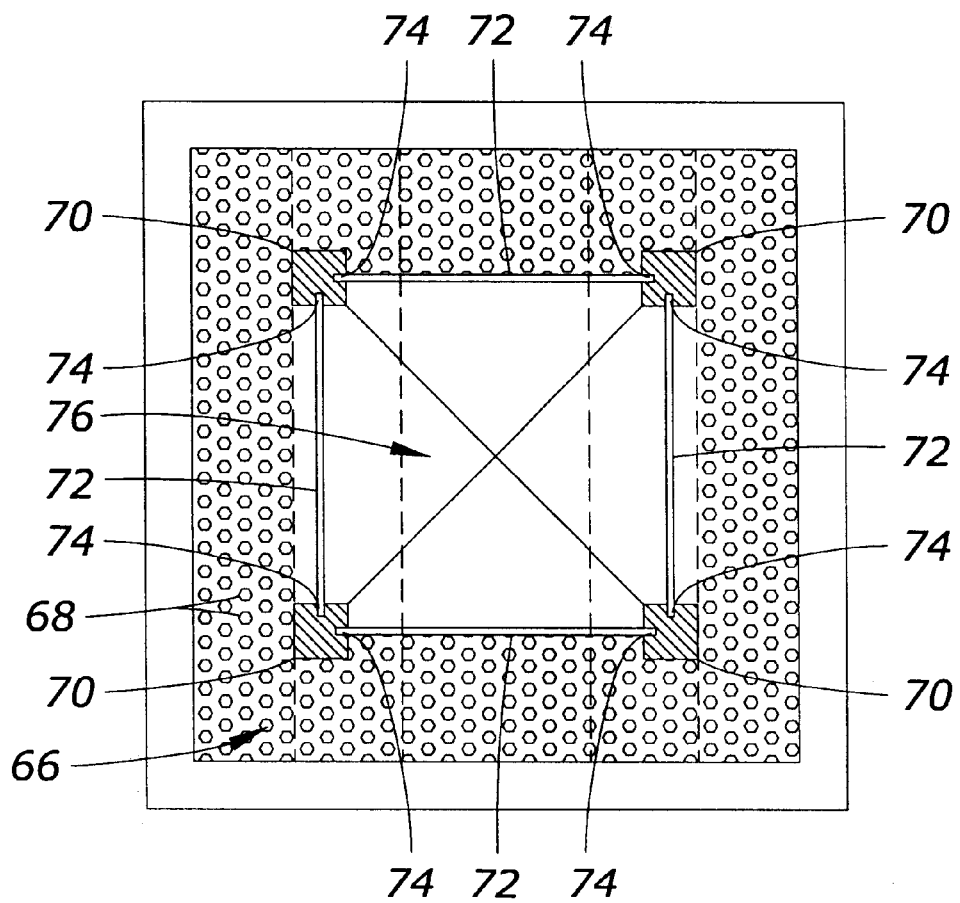
FIG. 4A is a sectional view taken along line 4A—4A of FIG. 4.

FIGS. 3, 4 and 4A show a modified form of the bird feeder designated by the numeral 48. Feeder 48 includes at its bottom a rectangular frame 50 formed from a first frame member 52, a second frame member 54, a third frame member 56, and a fourth frame member 58. Cross supports 60, 62 extend across the bottom of the frame 50. An interior groove 64 is provided around the inwardly facing surfaces of the frame members 52, 54, 56, 58 of the rectangular frame 50. Fitted within this interior groove 64 is a perforated plate 66 which is flat in configuration and which does not have upwardly turned edges at its perimeter. Plate 66 includes a plurality of perforations 68. The perforated plate may be stapled (staples not shown) to one or both of the cross supports 60, 62. Four corner posts 70 have their lower ends attached to the cross supports 60, 62. This attachment may be done by screws, staples, or other convenient securing means. Furthermore, the perforated plate 66 may include openings for the corner posts to fit through so that the corner posts directly engage the cross supports 60, 62. Alternatively, the corner posts may be attached to the cross supports 60, 62 through the perforated plate 66. Perforated plate 66 is made of plastic and is perforated rather than molded as described for the perforated plate forming the floor 16 of FIG. 1.

Four plastic panels 72 are fitted within vertical grooves 74 in the upstanding posts 70 so as to provide walls for an interior compartment 75. Plastic panels 72 are preferably transparent so that the level of the bird feed within the compartment 75 can be seen. As can be seen in FIGS. 4 and 4A, a plastic pyramid 76 has its base fitted within the four corner posts 70, and provides the function of diverting the bird seed outwardly beneath the lower edges of plastic panels 72. Lower edges of the plastic panel 72 are spaced above the perforated plate 66 so as to provide an opening 77.

The upper ends of the four corner posts 70 are joined by an upper rectangular frame 78 formed by two gable-shaped ends 80 and two cross frame members 82. Attached to the top of the gable-shaped ends 80 is a fixed roof member 84 which is hinged to a hinge roof member 86 by means of hinge 88.

Figure 6:
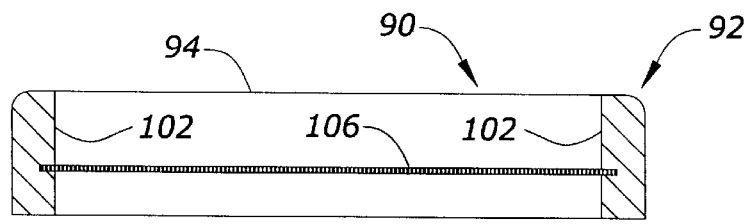
FIG. 6 is a sectional view of the tray taken along line 6—6 of FIG. 5.
Figure 5:
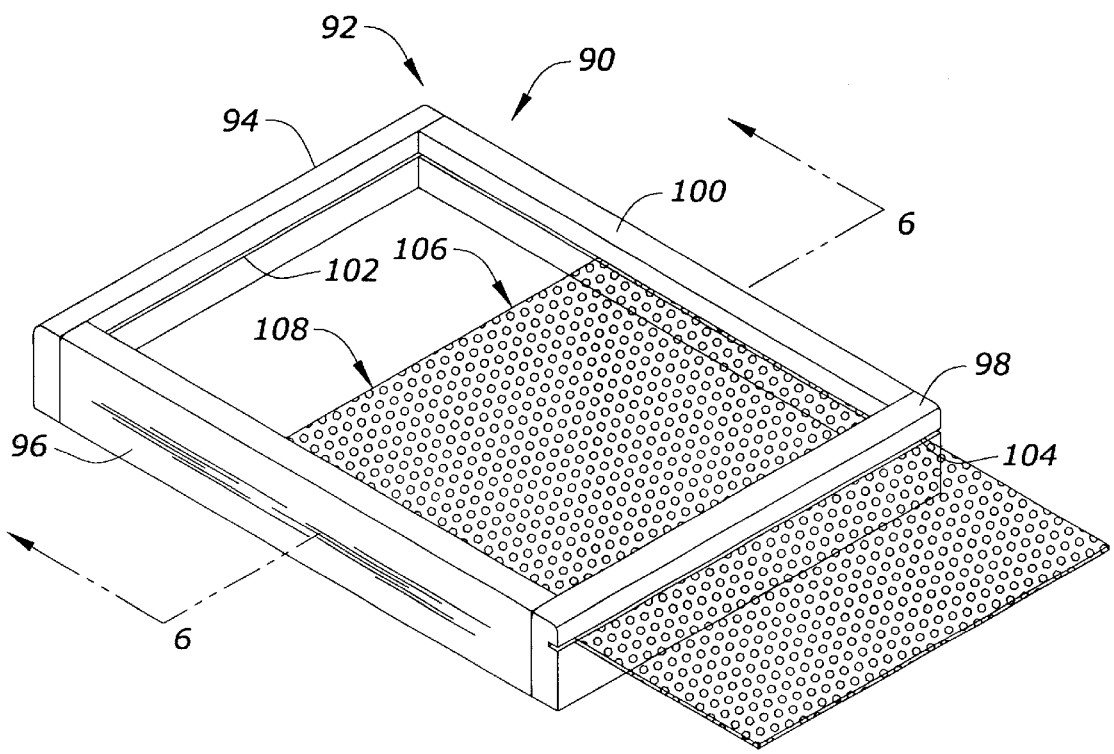
FIG. 5 is a perspective view of a tray using a perforated plastic floor.

FIGS. 5 and 6 show a feeder tray designated by the numeral 90. Feeder tray 90 includes a rectangular frame 92 formed from first, second, third, and fourth frame members 94, 96, 98, 100. An interior groove 102 extends around the inner perimeter of the rectangular frame 92. One of the frame members 98 includes a through slot 104 which registers with the interior groove 102. This permits a perforated plate 106 to be inserted through the slot 104 and fitted within the groove 102 so as to provide a floor for the tray 90. The perforated plate 106 is provided with perforations 108. The groove 102 is spaced upwardly from the lower edges of the rectangular frame 92 so as to permit moisture to drain through the aperture 108 in perforated plate 106. Perforated plate 106 is made of plastic similar to that described for the previous embodiments.

Figure 8:
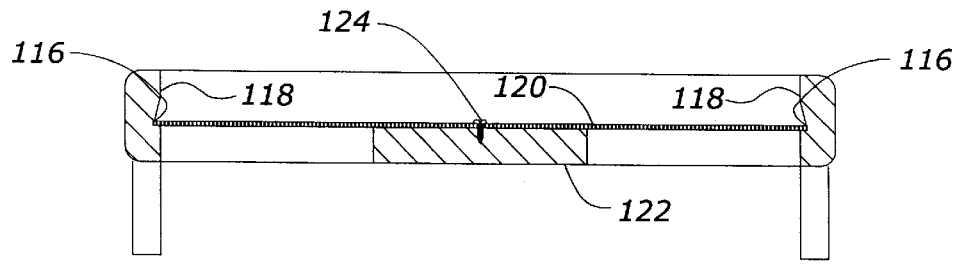
FIG. 8 is a sectional view of the tray shown in FIG. 7.
Figure 7:
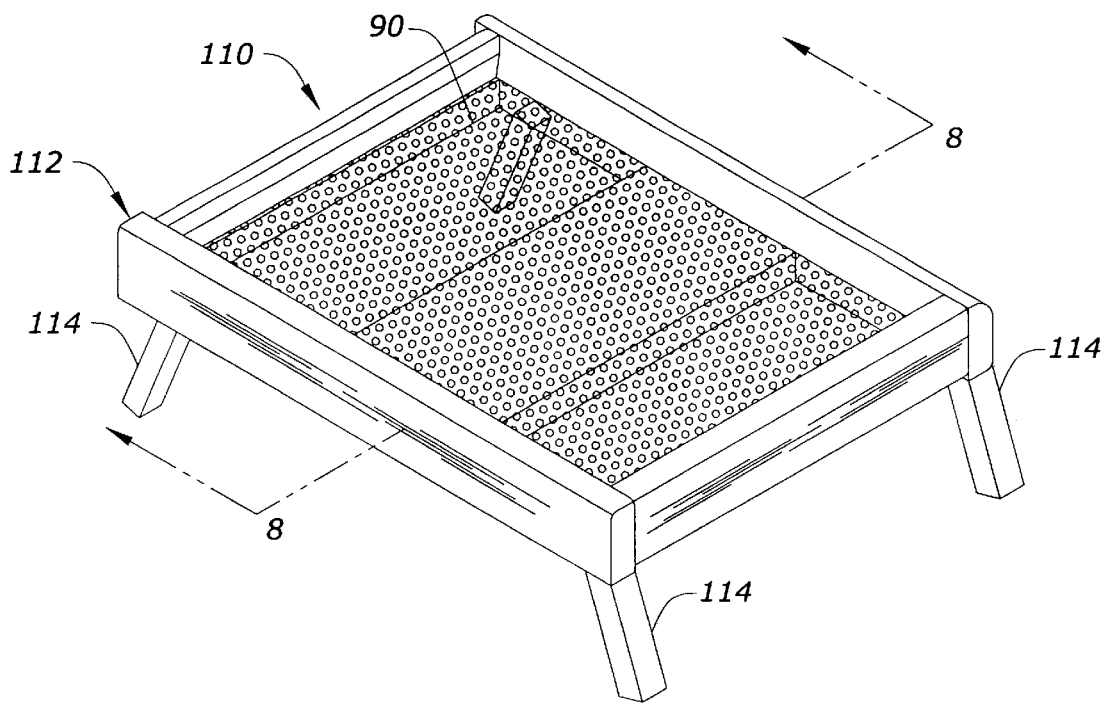
FIG. 7 is a perspective view of another tray using a perforated plastic floor.

FIGS. 7 and 8 show a modified form of a feeder tray designated generally by the numeral 110. Feeder tray 110 includes a rectangular frame 112 having four legs 114 extending downwardly therefrom. An interior parametric groove 116 is provided in the rectangular frame. Groove 116 includes a tapered upper edge 118 that permits a perforated plate 120 to be inserted from the top of the rectangular frame 112. The plastic perforated plate 120 has sufficient flexibility to deform during insertion and then to expand outwardly to fit within the groove 116. A cross frame member 122 extends between two opposite sides of the rectangular frame 112, and a screw 124 attaches the plastic perforated plate 120 to this cross frame member. Perforated plate is made of plastic in the same manner described for pervious embodiments.

Figure 10:
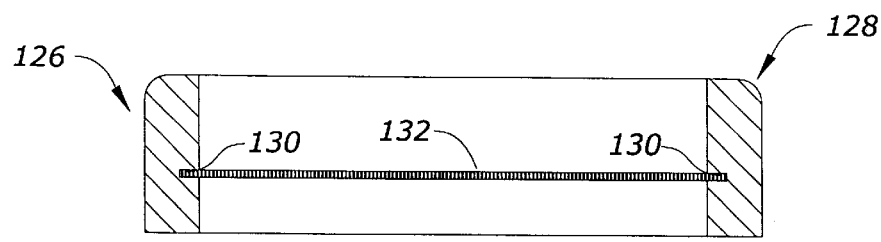
FIG. 10 is a sectional view taken along line 10—10 of FIG. 9.
Figure 9:
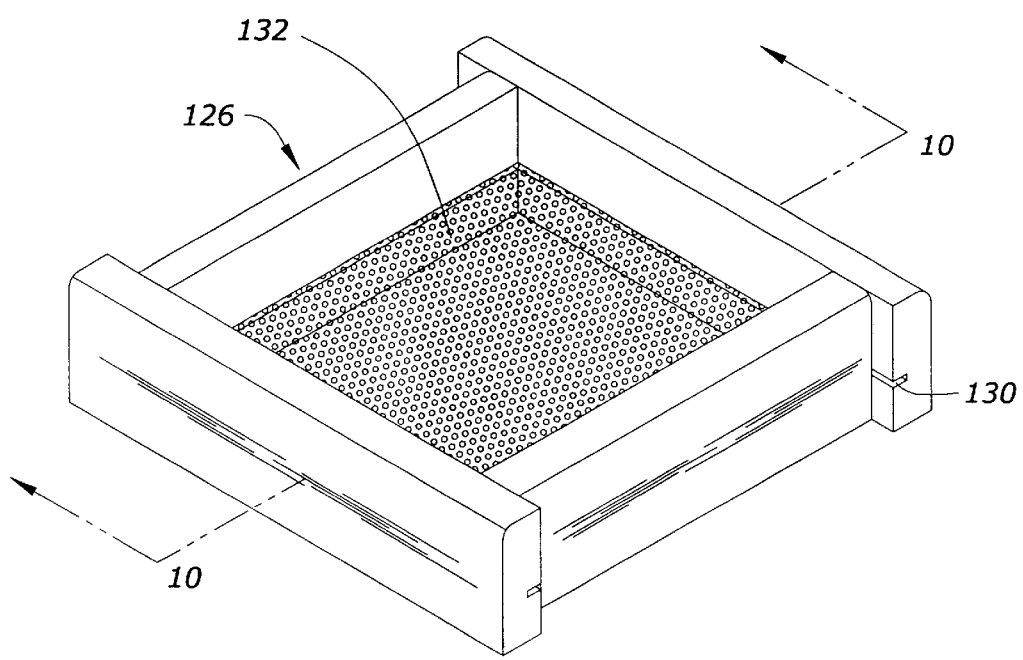
FIG. 9 is a perspective view of another tray using a perforated plastic floor.

FIG. 10 shows a modified form of a tray feeder which comprises a rectangular frame 128 having an interior groove 130 extending around the inner perimeter thereof. A perforated plate 132 has its margins inserted into the groove 130, and provides a floor for the tray feeder 126. The plastic perforated plate 132 is of the same construction described for the previous embodiments.

Specific structure details disclosed above are not to be interpreted as limiting the scope of the invention, but merely as a basis for the claims and for teaching one skilled in the art to employ the present invention in any appropriately detailed structure. Changes may be made in the specific structural details of that particular embodiment without departing from the spirit of the invention, especially as defined in the following claims.

What is claimed is:

1. A bird feeder comprising:

a first wall;

a second wall;

a third wall;

a fourth wall;

the first, second, third and fourth walls being assembled together to define a bird seed retaining area of the bird feeder, the bird seed retaining area having a bottom opening;

a first floor support member;

a second floor support member;

an apertured floor member comprised of a flat sheet extending between first, second, third and fourth surfaces and thereby substantially covering the bottom opening of the seed retaining area of the bird feeder, the apertured floor member being supported by the first floor support member and the second floor support member, the apertured floor member being manufactured from a perforated plastic material.

2. The bird feeder of claim 1 wherein the apertured floor member is colored.

3. The bird feeder of claim 1 wherein the apertured floor member is manufactured of a clear plastic material.

4. A bird feeder comprising:

a first wall portion defining a first surface;

a second wall portion defining a second surface;

a third wall portion defining a third surface;

a fourth wall portion defining a fourth surface;

an apertured floor member comprised of a flat sheet supported between the first, a second, third and fourth surfaces, the apertured floor member being constructed of a perforated plastic material.

5. The bird feeder of claim 4 wherein the apertured floor member has substantially circular apertures disposed therein.

6. The bird feeder of claim 5 wherein the apertures in the floor member are in the form of a repeating pattern.

7. The bird feeder of claim 4 wherein the apertured floor member is manufactured of a clear plastic material.

* * * * *